June 27, 1933.  R. H. COBB  1,915,594
WASTE HEAT POWER APPARATUS FOR INTERNAL COMBUSTION ENGINES
Filed Feb. 14, 1931
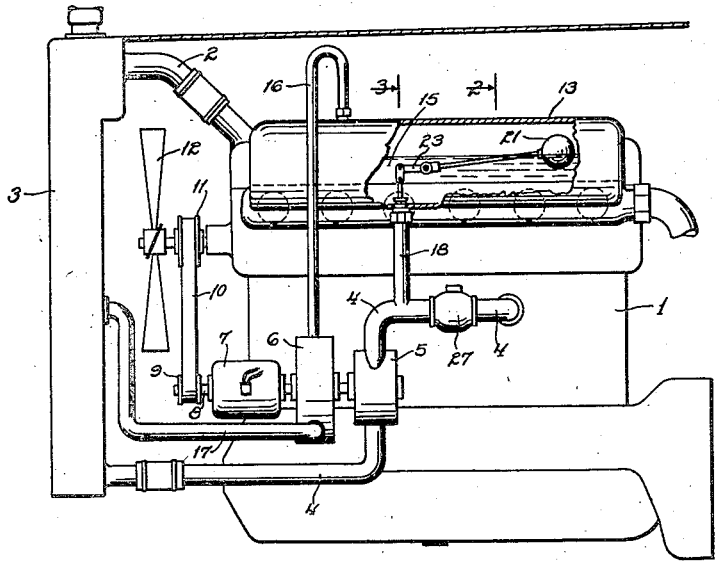
Fig. 1
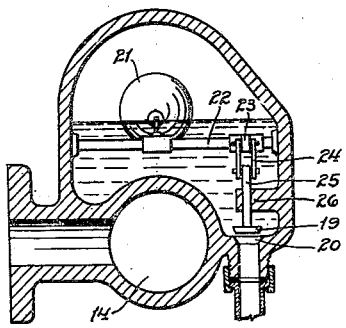
Fig. 3
Fig. 2
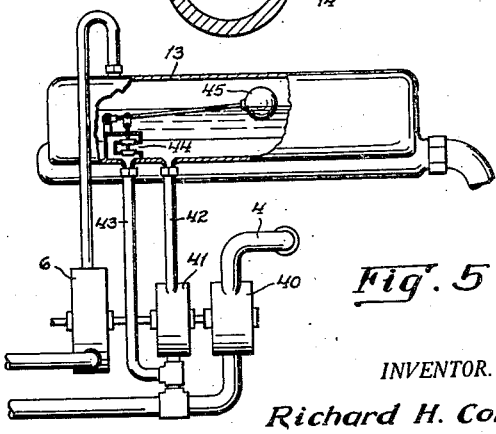
Fig. 5
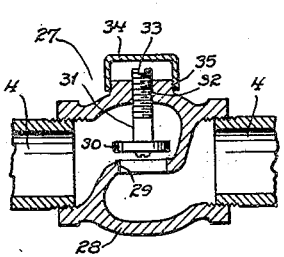
Fig. 4
INVENTOR.
Richard H. Cobb
BY Slough and Canfield
ATTORNEY.

Patented June 27, 1933

1,915,594

UNITED STATES PATENT OFFICE

RICHARD H. COBB, OF CLEVELAND, OHIO

WASTE HEAT POWER APPARATUS FOR INTERNAL COMBUSTION ENGINES

Application filed February 14, 1931. Serial No. 515,664.

This invention relates to apparatus for utilizing the waste heat of internal combustion engines and particularly apparatus for converting the waste heat into power.

It is one of the objects of this invention to provide an apparatus for converting into power waste heat of an internal combustion engine and for applying it to the operation of power consuming auxiliary apparatus of the engine in an improved manner.

Another object is to provide in association with an internal combustion engine, a source of power energized from waste heat of the engine and adapted to operate auxiliary apparatus of the engine which has heretofore been operated by power subtracted from the power developed by the engine.

Another object is to provide an improved apparatus for utilizing waste heat of an internal combustion engine in a manner to increase the proportion of net energy developed by the engine and available for useful work.

Another object is to provide an improved cooling system for internal combustion engines.

Another object is to provide an improved cooling system for internal combustion engines operable variably in accordance with temperature changes of the engine in an improved manner.

Another object is to provide for association with internal combustion engines, a steam power plant energized from waste heat of the engine and adapted to operate an engine cooling system in an improved manner.

Another object is to provide such a steam power plant adapted to operate a cooling system for the internal combustion engine variably in proportion to the temperature changes of the engine.

Another object is to provide a steam power plant of the class referred to, adapted to operate auxiliary apparatus of the engine which has heretofore been operated by power subtracted from that developed by the internal combustion engine itself.

Another object is to provide in association with an internal combustion engine and a steam power plant energized from waste heat of the engine, a steam boiler for the steam plant and apparatus for supplying water to the boiler to maintain the same at a predetermined level therein, from the water cooling circulating system of the internal combustion engine in an improved manner.

Other objects will be apparent to those skilled in the art to which my invention pertains.

My invention is fully disclosed in the following description taken in connection with the accompanying drawing, in which:

Fig. 1 is a side elevational, partly cross-sectional view of an internal combustion engine, and with an embodiment of my invention associated therewith;

Fig. 2 is a cross-sectional view to an enlarged scale taken approximately from the plane 2 of Fig. 1;

Fig. 3 is a cross-sectional view to an enlarged scale taken approximately from the plane 3 of Fig. 1;

Fig. 4 is a cross-sectional view to an enlarged scale of an adjustable flow restricting device which I may employ in the embodiment of my invention of Fig. 1;

Fig. 5 is a fragmentary view similar to Fig. 1 with parts omitted for simplicity and illustrating a modification of my invention.

Referring to the drawing, I have shown generally at 1 an internal combustion engine, which will be recognized by those skilled in the art to be generally of the motor vehicle type.

The engine 1 is provided with the usual water jacket not shown for cooling purposes but which communicates with a discharge conduit 2, a radiator 3, and a supply conduit 4 in which, as at 5, is disposed a circulating pump.

The pump 5 preferably forms one part of a unitary mechanism, other parts to be more fully described being a steam-operable engine 6, an electric current generator 7, all preferably driven in unison, having a common interconnecting power shaft 8 on a portion of which is a pulley 9 connected by a belt 10 to a pulley 11 for operatively driving a cooling fan 12 for the usual purposes.

The pump 5, engine 6, generator 7 may all be supported on the frame of the engine 1 in any suitable manner not shown, and the exact construction of these units and the mounting therefor forms no essential part of my invention. The electric generator 7, for supplying current to the battery of the vehicle or to a battery of the engine ignition system, may be employed or not as desired, that is to say, it may be driven independently of the steam engine 6, but preferably the pump 5 and the fan 12 are adapted to be driven by the steam engine 6.

To supply steam for the engine 6 I provide a boiler shown generally at 13. In the preferred form of my invention, as shown in Figs. 2 and 3, the boiler is formed integrally with the exhaust manifold 14 of the engine in order that heat from the exhaust gases in the manifold may be more readily conducted to water, indicated at 15, in the boiler 13. Steam is conducted from an upper portion of the boiler by a steam pipe 16 to the steam engine 6, and after passing therethrough is conducted by a pipe 17 into the radiator 3 where it may be condensed by contact with water in the radiator.

Water is supplied to the boiler through a supply conduit 18 forming a branch from the conduit 4 on the high pressure side of the pump 5. Admission of water from the conduit 18 to the boiler is controlled by a valve comprising a valve element 19 and a valve seat 20 in the boiler, the valve element 19 being adapted to be moved from closed to open position by movement transmitted thereto from a float 21 in the boiler, the float being adapted to rock a shaft 22 supported in suitable bearings in the boiler and the shaft 22 being connected by an arm 23, and a link or links 24 to a stem 25 of the valve element 19 reciprocable in a supporting bearing 26.

Between the conduit 18 and the water jacket of the engine, is disposed a device 27, shown separately in Fig. 4, comprising a housing 28 in the line of the conduit 4, the housing having therein a port 29 associated with which is a disc 30 provided with a stem 31 screw-threaded as at 32 in the housing 28 and provided with a screwdriver slot 33. The threads as at 32 are sealed by a cap 34 screwed onto the housing 28 as at 35.

By removing the cap 34, the disc 30 may be adjusted toward and from the port 29 to adjust effective fluid flow area of the port.

In practice, the area of the port 29 is adjusted so that a relatively high fluid pressure created by the pump 5 and sufficient to force water through the branch conduit 18 into the boiler 13 against the counter-pressure of steam therein, will be reduced at the port 29 to a value suitable for circulating water through the cooling system of the engine above described.

In operation of my invention as thus described, it may be assumed that a suitable amount of water 15 is in the boiler and that the engine is cool. Upon starting the engine, the fan 12 and the pump 5 will not operate as is customary in prior practice, but will remain stationary. Operation of the engine warms it up and the heat of the exhaust gases in the manifold 14 warms up water 15 in the boiler and finally generates steam therefrom. By the time the engine has reached the maximum desirable temperature thereof, the steam pressure generated will be sufficient to operate the steam engine 6. This result can be attained, for a given steam engine 6, by suitably adjusting the amount of water in the boiler and suitably providing a sufficient area of exposure of the water to the heat of the exhaust gases from the engine.

As soon as the steam engine 6 begins to operate, it pumps water by means of the pump 5 through the circulating system of the engine, and also rotates the fan 12 effecting a cooling operation on the engine. If the engine should tend to heat up still hotter, it will generate a greater steam pressure in the boiler and operate the engine 6 at a faster rate, thus driving the pump 5 faster and the fan 12 faster and effecting a greater cooling action on the engine. Thus any tendency of the engine to get hotter is counteracted by a corresponding greater activity of the cooling system and thus the engine is maintained at not greater than a preselected temperature.

Obviously, if the engine were hot or warm when it was started up, the cooling system would very quickly come into action because of the generation of steam after a very short interval.

The generation of steam from the water in the boiler lowers the level of the water and causes the float 21 to descend and open the valve 19—20. The pressure supplied by the conduit 18 may at all times be greater than the steam pressure in the boiler, being adjustable by the device 27, and the valve may be held closed, against the difference of pressure, by the leverage effected by the float 21. It will be understood that for an increase of steam pressure there is correspondingly an increase of fluid pressure in the conduit 18 due to the greater rate at which the pump 5 is operated by the increase of steam pressure.

In the form of my invention shown in Fig. 5, the pump is divided into two parts 40 and 41. These may both be portions of a single pump structure or may be separate pumping units driven by the steam engine 6. The pump 40 is designed to generate a fluid pressure suitable to pump water through the engine cooling system at the desired rate. The pump 41 is designed to produce a higher fluid pressure and has a supply conduit 42 leading directly to the boiler and a by-pass conduit 43 leading from the boiler to the low pressure side of the pump 41.

A valve construction, shown generally at 44, is adapted to be opened and closed to connect or disconnect the conduit 43 with the water in the boiler. The valve construction 44 is of the well known balance valve type and is operable by a float 45 to be opened when the float is raised and to be closed when the float is depressed.

In the operation of the form of my invention of Fig. 5, steam from the boiler 13 operates the steam engine 6 as in the form of Fig. 1 and operates both pumps 40 and 41, the pump 40 supplying cooling water to the engine circulating system and the pump 41 being adapted to supply water to the boiler when needed. When the water in the boiler has fallen to a predetermined level and closes the valve 44, the pump 41 will force water through the conduit 42 into the boiler 13 against the steam pressure therein. When the water level in the boiler has risen to the desired value, it will open the valve 44 whereupon the conduit 43 becomes a by-pass around the pump 41 and the water pumped by the pump 41 circulates in a local circuit including the pump itself, the conduit 42, the boiler 13 and the conduit 43. When the water in the boiler has been consumed in the form of steam sufficiently to lower the level, the valve 44 will be closed again.

In some instances, the steam pressure in the boiler may, upon opening the valve 44, force water out of the boiler downwardly through the conduit 43 and into the circulating system, but this will immediately effect a lowering of the water level in the boiler and a closing of the valve.

It will be observed, that the energy required to operate the cooling system above described, as well as the generator 7 when the same is employed in connection with the steam engine, is not derived from the power developed by the internal combustion engine, that is to say, from its power delivering shaft as in prior practice, but is derived from the heat of the engine exhaust which would otherwise be wasted. Thus all of the energy developed by the engine at its crank shaft may be applied to propel the vehicle.

As is well known, the power necessary, in the ordinary internal combustion engine, to operate the fan and to operate the generator and water circulating pump is a considerable portion of the entire power developed by the engine.

Furthermore, besides saving power of the internal combustion engine, my invention provides a cooling system which is inherently self-regulating, that is to say, effects a greater cooling action in response to an increase of temperature of the engine above a predetermined value, any tendency of the engine to get hotter being met by an increased activity on the part of the cooling system, this regulating function flowing inherently from the employment of a steam engine driven by steam generated by the waste heat from the engine.

My invention is not limited to the exact details of construction shown and described. Many changes and modifications may be made therein without departing from the spirit of the invention or sacrificing its advantages.

I claim:

1. In an apparatus for utilizing the waste heat from an internal combustion engine, a boiler, adapted to be heated by the exhaust gases from the engine, a steam engine adapted to be driven by steam generated in the boiler, and a water circulating pump driven by the steam engine and connected to the cooling water circulating system of the engine for circulating water therethrough, the steam engine being adapted to increase the rate of water circulation by the pump in response to an increase of steam pressure resulting from an increase of engine temperature.

2. In an apparatus for utilizing the waste heat from an internal combustion engine, a boiler, adapted to be heated by the exhaust gases from the engine, a steam engine adapted to be driven by steam generated in the boiler, and a water circulating pump driven by the steam engine and connected to the cooling water circulating system of the engine for circulating water therethrough, the steam engine being adapted to increase the rate of water circulation by the pump in response to an increase of steam pressure resulting from an increase of engine temperature, and a cooling fan driven by the steam engine.

3. In an apparatus for utilizing the waste heat from an internal combustion engine, a boiler, adapted to be heated by the exhaust gases from the engine, a steam engine adapted to be driven by steam generated in the boiler, a water circulating pump driven by the steam engine and connected to the cooling water circulating system of the engine for circulating water therethrough, the steam engine being adapted to increase the rate of water circulation by the pump in response to an increase of steam pressure resulting from an increase of engine temperature, and an exhaust from the steam engine into the water circulating system.

4. In an apparatus for utilizing the waste heat from an internal combustion engine, a boiler, adapted to be heated by the exhaust gases from the engine, a steam engine adapted to be driven by steam generated in the boiler, a water circulating pump driven by the steam engine and connected to the cooling water circulating system of the engine for circulating water therethrough, the steam engine being adapted to increase the rate of water circulation by the pump in response to an increase of steam pressure resulting from an increase of engine temperature, and a water supply conduit from the high pressure side of the pump to the boiler.

5. In an apparatus for utilizing the waste heat from an internal combustion engine, a boiler, adapted to be heated by the exhaust gases from the engine, a steam engine adapted to be driven by steam generated in the boiler, a water circulating pump driven by the steam engine and connected to the cooling water circulating system of the engine for circulating water therethrough, the steam engine being adapted to increase the rate of water circulation by the pump in response to an increase of steam pressure resulting from an increase of engine temperature, a water supply conduit from the high pressure side of the pump to the boiler, and a valve controlling flow through the supply conduit operated by a float in the boiler to maintain a substantially level of water in the boiler.

6. In an apparatus for utilizing the waste heat from an internal combustion engine, a boiler, adapted to be heated by exhaust gases from the engine, a steam engine adapted to be driven by steam generated in the boiler, a water circulating pump driven by the steam engine, a cooling water supply conduit from the pump to the circulating system of the engine, a restriction in the supply conduit, and a boiler conduit between the boiler and a point in the supply conduit between the high pressure side of the pump and the restriction.

7. In an apparatus for utilizing the waste heat from an internal combustion engine, a boiler, adapted to be heated by exhaust gases from the engine, a steam engine adapted to be driven by steam generated in the boiler, a pumping device driven by the steam engine and comprising a portion connected to the cooling water circulating system of the engine for circulating water therethrough, the steam engine being adapted to increase the rate of water circulation by the pump in response to an increase of steam pressure resulting from an increase of engine temperature, and a portion connected to the cooling water system and adapted to draw water therefrom and pump it into the boiler.

8. In an apparatus for utilizing the waste heat from an internal combustion engine, a boiler, adapted to be heated by exhaust gases from the engine, a steam engine adapted to be driven by steam generated in the boiler, a pumping device driven by the steam engine and comprising a portion connected to the cooling water circulating system of the engine for circulating water therethrough, the steam engine being adapted to increase the rate of water circulation by the pump in response to an increase of steam pressure resulting from an increase of engine temperature, and a portion connected to the cooling water system adapted to draw water therefrom and to pump through a boiler conduit into the boiler, and a valve controlling flow through the boiler conduit operated by a float in the boiler to substantially maintain a level of water in the boiler.

9. The method of cooling an internal combustion engine which includes first generating steam by the waste heat of the engine exhaust, driving a steam engine with the steam thus generated, driving a water circulating pump connected to the cooling system of the engine by means of the steam engine, and driving a cooling fan by the steam engine and causing the steam engine to operate faster upon the generation of an increase of steam pressure in the boiler in correspondence with an increase of engine temperature.

10. The method of cooling an internal combustion engine which includes driving the water circulating pump of the engine by an auxiliary source of power operable to develope driving power at a variable rate in correspondence with variations of engine temperature.

11. In an apparatus for cooling an internal combustion engine, a water circulating system therefor, a pump for circulating water through the system and an auxiliary source of power for driving the pump, the auxiliary power source being of the thermally operable type and operable at varying power delivering rates in correspondence with variations of engine temperature.

In testimony whereof I hereunto affix my signature this 11th day of February, 1931.

RICHARD H. COBB.